Sept. 9, 1930.          G. A. BOESGER          1,775,304
                     CONTINUOUS DUST ARRESTER
                     Filed Oct. 27, 1926     2 Sheets-Sheet 1

INVENTOR
George A. Boesger
BY Jay, Oberlin & Jay ATTORNEYS.

Sept. 9, 1930.  G. A. BOESGER  1,775,304
CONTINUOUS DUST ARRESTER
Filed Oct. 27, 1926  2 Sheets-Sheet 2
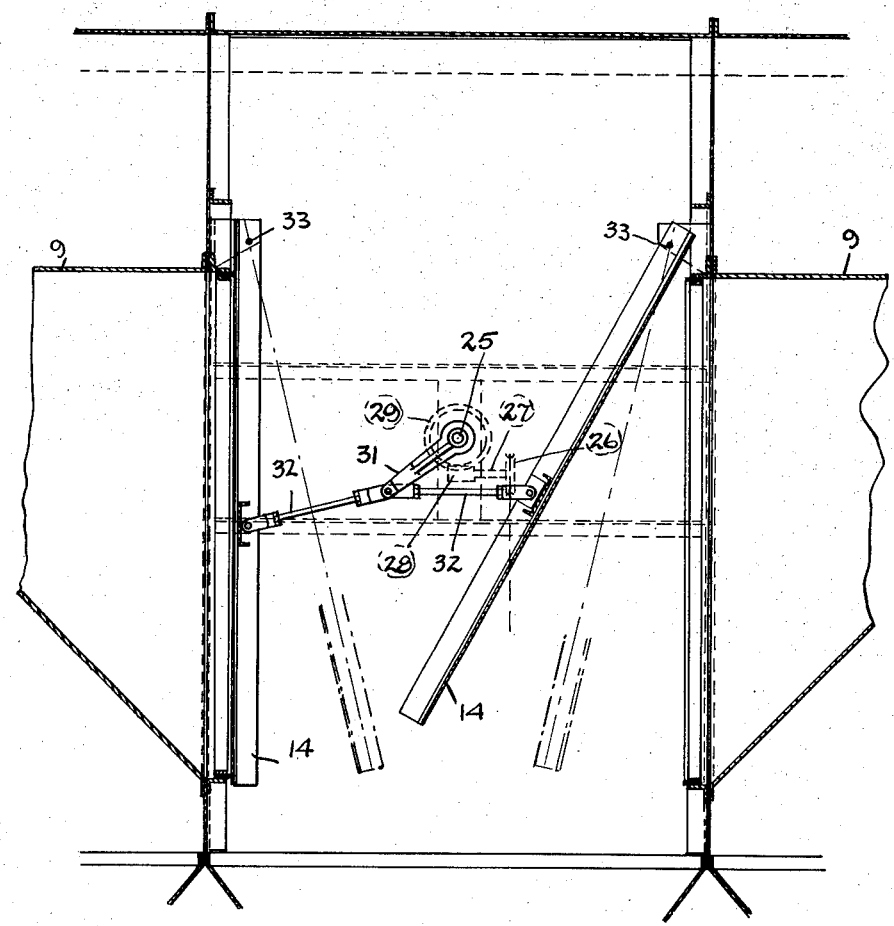
Fig. 3.
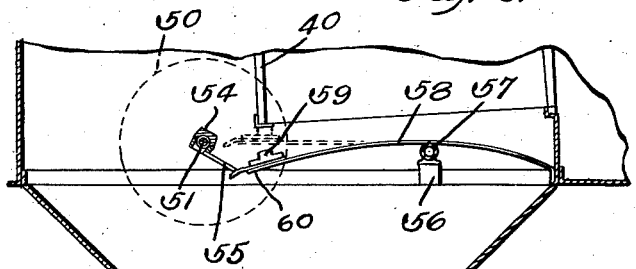
Fig. 4.
INVENTOR.
George A. Boesger
BY
Fay, Oberlin & Fay
ATTORNEYS Patented Sept. 9, 1930

1,775,304

UNITED STATES PATENT OFFICE

GEORGE A. BOESGER, OF CLEVELAND, OHIO, ASSIGNOR TO THE W. W. SLY MANUFACTURING COMPANY, OF CLEVELAND, OHIO, A CORPORATION OF OHIO

CONTINUOUS DUST ARRESTER

Application filed October 27, 1926. Serial No. 144,492.

The present invention relates to apparatus for continuously removing dust and dirt from a dust laden air stream and for recovering such dust. The present apparatus is an improved mechanism, similar in general operation to that shown in my United States Letters Patent No. 1,621,824, and has for its object the simplification of such previous structure. In the present apparatus, use is made of a single settling or intake chamber, with two screen chambers mounted on opposite sides of the settling chamber. An exhaust chamber contiguous to said settling chamber is also provided, and gates or doors are so arranged that the settling chamber and the exhaust chamber may be connected to either screen chamber alone or to both screen chambers. Rapping means for each screen chamber are also provided and as the screens may be quickly rapped and the chambers returned to operation, it has been found possible to use both chambers most of the time and to shut down one chamber and rap the same during which interval the other chamber can be forced into carrying the entire load. To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
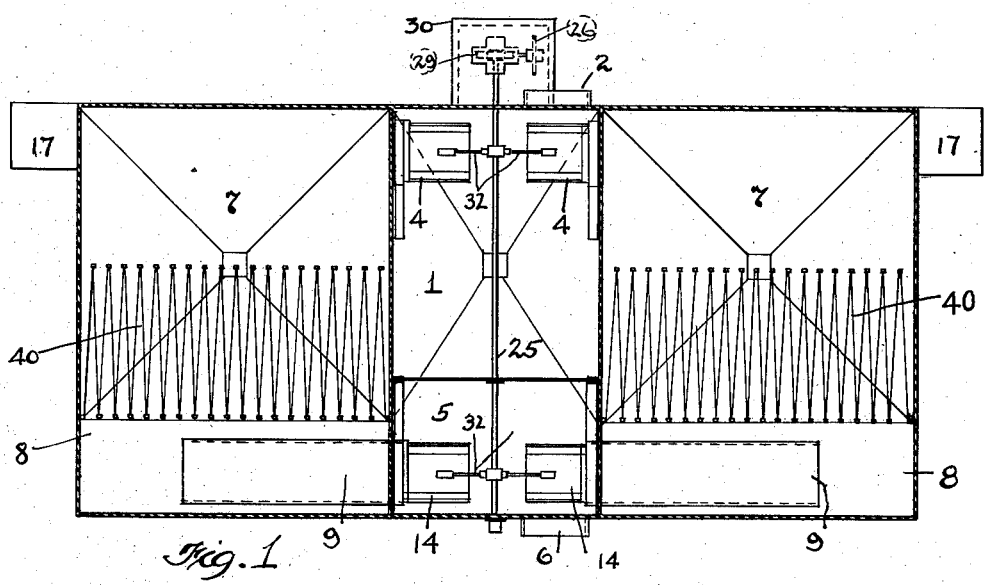
Figure 2:
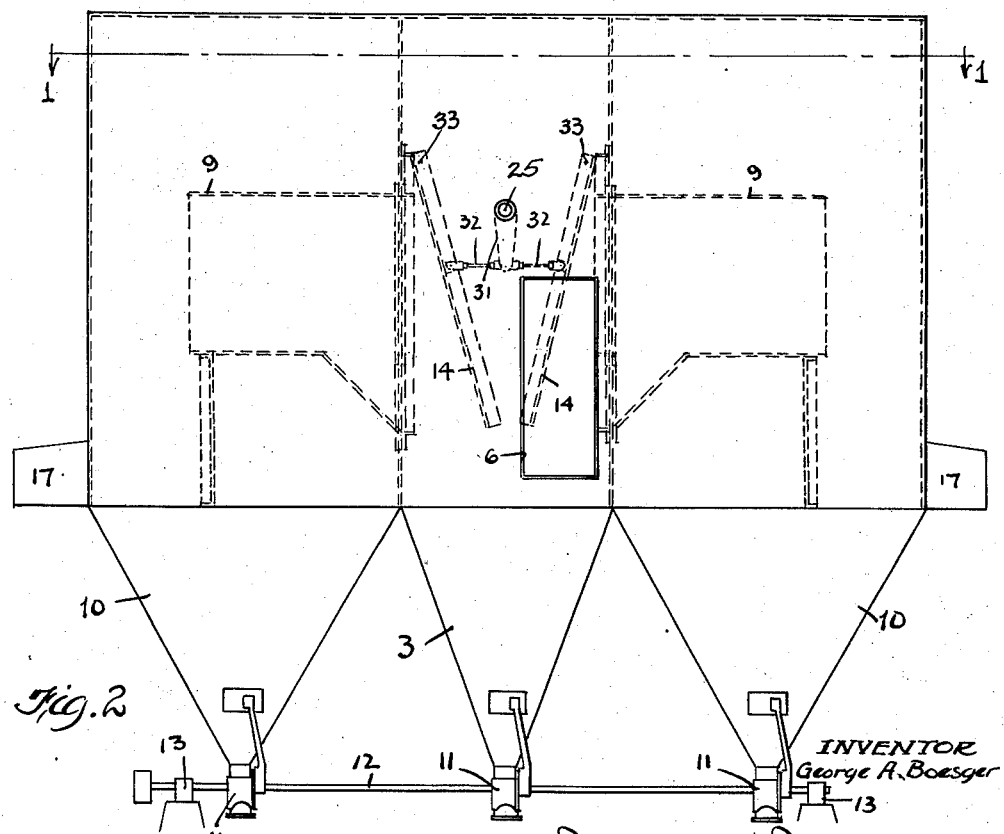

In said annexed drawing:

Fig. 1 is a horizontal section on the line 1—1 of Fig. 2; Fig. 2 is a front elevational view of the apparatus; Fig. 3 is a vertical sectional view showing the gate operating mechanism; and Fig. 4 is a sectional view of the lower end of a screening chamber showing the rapping and discharge mechanisms.

The present apparatus provides a centrally mounted settling or air intake chamber 1, having a dust laden air inlet pipe 2. This chamber is also provided with a discharge hopper 3 and has a gate 4 in each side. At one end of the settling chamber and contiguous thereto is an exhaust chamber 5 having an exhaust pipe 6 for the cleaned air and this chamber has a gate 14 in each side. Mounted on each side of the chambers 1 and 5 is a screen chamber 7. The rear side of each chamber 7 is unfilled and communicates with the settling chamber through its gate 4. The screening or dust arresting elements 40 are mounted in the chambers so as to leave exhaust passages 8 on the front as shown in Fig. 1, in which passages are preferably mounted exhaust casings 9 communicating with the gates 14. Each of the chambers 7 has a discharge hopper 10.

At the bottom of each hopper is a continuous discharge valve mechanism 11, such valves being driven from a single shaft 12 carried in bearings 13 and driven from any suitable source of power. The details of such valve and operating mechanism are shown in my issued United States Patent Number 1,621,824, previously referred to. The rapping mechanism for the screens is identical to that shown in such issued patent except that the screen in each chamber is rapped by its own operating mechanism, there being a motor 50 enclosed in a box 17 mounted on each chamber 7, and the operator manually controls the operation of such motors. While it is to be understood that any desired driving connection may be provided between the motor 50 and the rapping mechanism, I have illustrated one type arrangement which can be used. The shaft 51 of the motor 50 is suitably supported and carries at its extremity a block 54. A finger 55 is mounted upon said block for a purpose which will appear. Beneath the screen 40 there is provided a block 56 carrying a support 57 forming a fulcrum for a spring arm 58 adjacent the free end of which there is mounted a block 59. The end 60 of said arm 58 extends into the path of the finger 55. As will be obvious, as the shaft 54 is rotated, the finger 55 will strike the end 60 of the arm 58 to flex the same and then to release said arm, whereby the block 59 is caused to strike the lower free corner of the screen 40.

The gates 4 and 14 during the normal operation of the apparatus, are all open, such normal open position being shown in dotted lines in Figs. 2 and 3. When one chamber is closed for rapping, both the gates 4 and the gates 14 for that chamber are closed, and the other chamber is forced to carry the entire load until the first chamber has been cleared and is again thrown into operation. As the time for rapping and cleaning is short, it has been found that one chamber can easily carry the overload for the short period required and the operator closes and cleans the screen chambers as becomes necessary, this time being dependent upon the amount of air being cleaned and the amount of dirt carried thereby.

The gate operating mechanism consists of a shaft 25 extending through the settling and exhaust chambers and carried, on suitable support or bearings, the means for rotating or rocking such shaft consisting of a sprocket wheel 26, preferably chain operated, this sprocket being carried on a cross shaft 27 having a worm 28 in mesh with a worm wheel 29 on the shaft 25, this gearing being mounted in a suitable casing 30 at the intake side of the settling chamber. Attached to the shaft 25 opposite each pair of gates is a rocker arm 31. To the free end of arm 31 are pivotally attached two links 32 which have their other ends pivotally attached to the gates. The gates themselves are pivotally mounted about horizontal pins or hinges 33 and thus movement of the arm will close the two gates to one screen chamber and simultaneously open those leading to the other chamber. When one chamber is cut off, and the gates are closed, then the gates to the other chamber are held in their wide open position as shown in Fig. 3 in full lines, while when both chambers are in operation all four gates are in their half open position as shown in dotted lines on Fig. 3.

The present apparatus is illustrated as requiring manual control both for opening and closing the gates and for operation of the rapping mechanism. It is of course to be understood that they may be automatically controlled and operated as shown in my issued patent, but for a majority of installations the manual control is preferable as the chambers may be closed down and cleaned only as required and this requirement varies greatly with the air load being cleaned. The present apparatus is easily erected and the size of the screen chambers may be varied to suit the operating conditions. Each screen chamber may be doubled in size by merely adding an additional unit thereto and as the screen chambers are of standard sizes, almost any capacity dust arrester may be built up, the capacity of the unit being limited only by the amount of air which can economically be brought into a single settling chamber.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a continuous dust arrester, the combination of a centrally located settling chamber, a screen chamber on each side thereof, doors connecting said settling chamber with said two screen chambers, and means for closing the door to one chamber and for opening the door to the other chamber, a power driven rapping means for each chamber, and continuous discharge means for each of said chambers.

2. In a continuous type dust arrester, the combination of a centrally located settling chamber having a dust laden air inlet, a clean air discharge chamber having an exhaust outlet, two screen chambers mounted on opposite sides of said settling chamber, a gate from said settling chamber to each of said screen chambers, a gate from each of said screen chambers to said discharge chamber, operating means connected to said gates to close both gates from one screen chamber and open the gates to the other screen chamber, continuous discharge means for each of said settling and screen chambers, and a power driven rapping device for each of said screen chambers.

3. In a continuous type dust arrester, the combination of a centrally located settling chamber having a dust laden air inlet, a clean air discharge chamber having an exhaust outlet, two screen chambers mounted on opposite sides of said settling chamber, a gate from said settling chamber to each of said screen chambers, a gate from each of said screen chambers to said discharge chamber, operating mechanism for said gates, so arranged as to maintain all of said gates partially open, or to close both gates to one screen chamber, and open wide both gates to the other screen chamber, continuous discharge means for each of said settling and screen chambers, and a power driven rapping device for each of said screen chambers.

4. In a continuous type dust arrester, the combination of a centrally located settling or intake chamber, having a dust laden air intake, a clean air discharge chamber having an exhaust outlet, a screen chamber mounted on each side of said intake and exhaust chambers, a gate between each of said screen chambers and said settling chamber, a gate between each of said screen chambers and said exhaust chamber, manually controlled operating mechanism connected to all of said gates, and adapted to operate both gates to each screen chamber together, said mechanism being so arranged as to allow all of said gates to be open or to close both gates to one screen chamber, and to open wide both gates to said other screen chamber, a discharge hopper for each of said inlet and screen chambers, power operated continuous discharge means for each hopper, and a power operated rapping means for each screen chamber.

5. Gate operating mechanism for a continuous type dust arrester having a settling chamber, an exhaust chamber, and two screen chambers, with a gate connecting each screen chamber with said settling chamber, and a gate connecting each screen chamber with said exhaust chamber, consisting of a rotatable shaft extending through said settling and exhaust chambers, a crank rotatable with said shaft for each pair of gates to said two screen chambers, two links pivotally connected to each pair of gates and to said crank, movement of said shaft and cranks being adapted to close both gates to one screen chamber and simultaneously open both of said gates to the other of said screen chambers.

6. Gate operating mechanism for a continuous type dust arrester having a settling chamber, an exhaust chamber, and two screen chambers, with a gate connecting each screen chamber with said settling chamber, and a gate connecting each screen chamber with said exhaust chamber, consisting of a rotatable shaft extending through said settling and exhaust chambers, a crank rotatable with said shaft for each pair of gates to said two screen chambers, two links pivotally connected to each pair of gates and to said crank, movement of said shaft and cranks being adapted to close both gates to one screen chamber and simultaneously open both of said gates to the other of said screen chambers, manually operated means for rotating said shaft consisting of a sprocket wheel and chain for manual operation, and gearing operatively connecting said sprocket wheel and said shaft.

Signed by me this 25th day of October, 1926.

GEORGE A. BOESGER.